United States Patent
Fowler et al.

[15] 3,650,246
[45] Mar. 21, 1972

[54] AUTOMATIC EGG COLLECTION SYSTEM FOR POULTRY NESTS

[72] Inventors: Grady C. Fowler, Route 7, P.O. Box 235; Ben F. Venable, Route 8, P.O. Box 640, both of Mt. Airy, N.C. 27030

[22] Filed: Mar. 18, 1970

[21] Appl. No.: 20,498

[52] U.S. Cl. ................................119/48, 119/17, 119/21
[51] Int. Cl. ........................................................A01k 31/16
[58] Field of Search..............................119/48, 45, 17, 18, 21

[56] References Cited

UNITED STATES PATENTS

| | | |
|---|---|---|
| 3,485,214 | 12/1969 | Burkholder................................119/48 |
| 3,467,065 | 9/1969 | Van Huis..................................119/48 |
| 3,139,065 | 6/1964 | Willauer, Jr............................119/45 R |
| 2,708,419 | 5/1955 | Brown....................................119/45 R |
| 3,118,425 | 1/1964 | Kurtz.....................................119/45 R |
| 3,164,129 | 1/1965 | Rigterink...............................119/45 R |
| 3,167,052 | 1/1965 | Kuhlmann..............................119/45 R |
| 3,285,230 | 11/1966 | Van Huis et al.......................119/52 R |

Primary Examiner—Aldrich F. Medbery
Attorney—David Rabin

[57] ABSTRACT

A system for gathering eggs from a plurality of nesting units and conveying the eggs to a collection area for grading. A conveyor having a resilient surface with egg-receiving indentations spaced therealong is completely covered within the nesting area to prevent egg damage. The eggs are dispensed automatically from the nests onto the conveyor and from the conveyor to a grading table.

12 Claims, 12 Drawing Figures

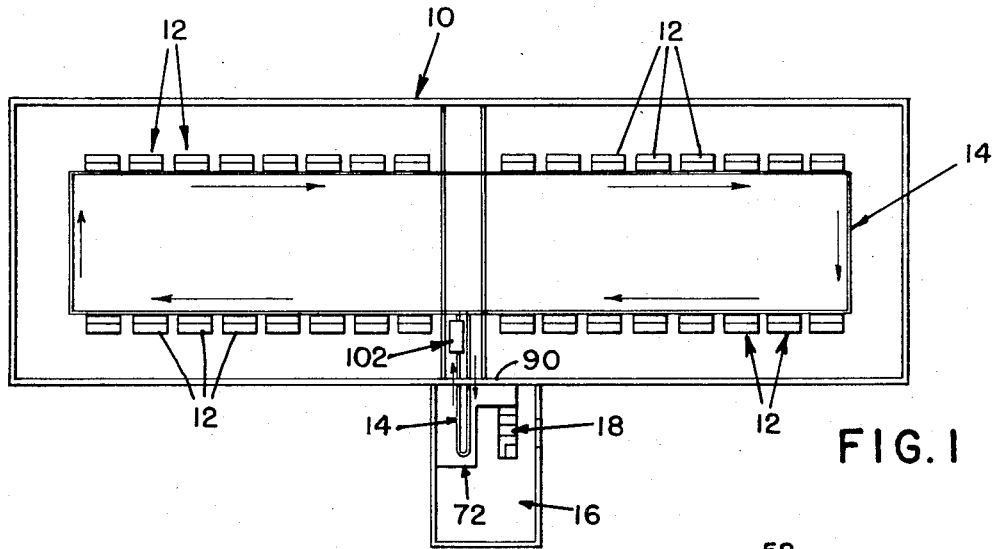
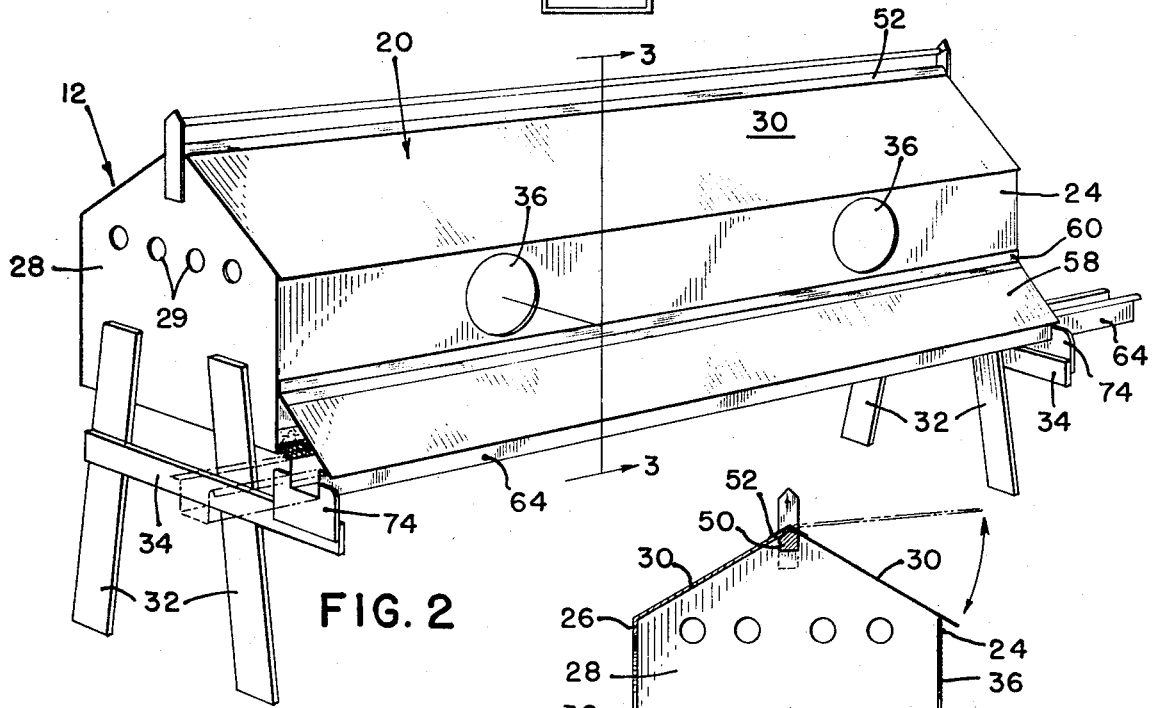
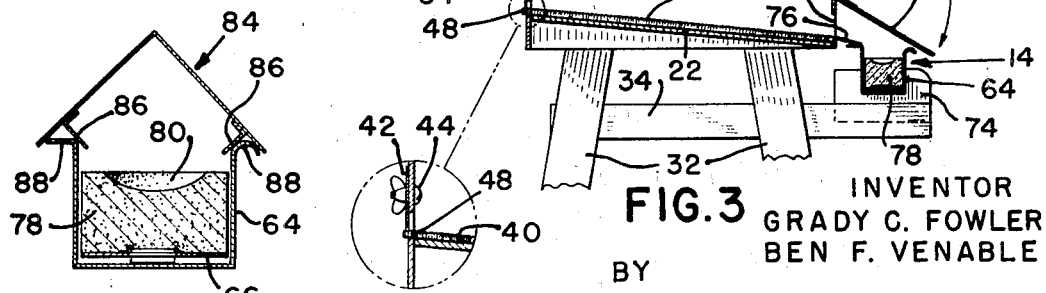

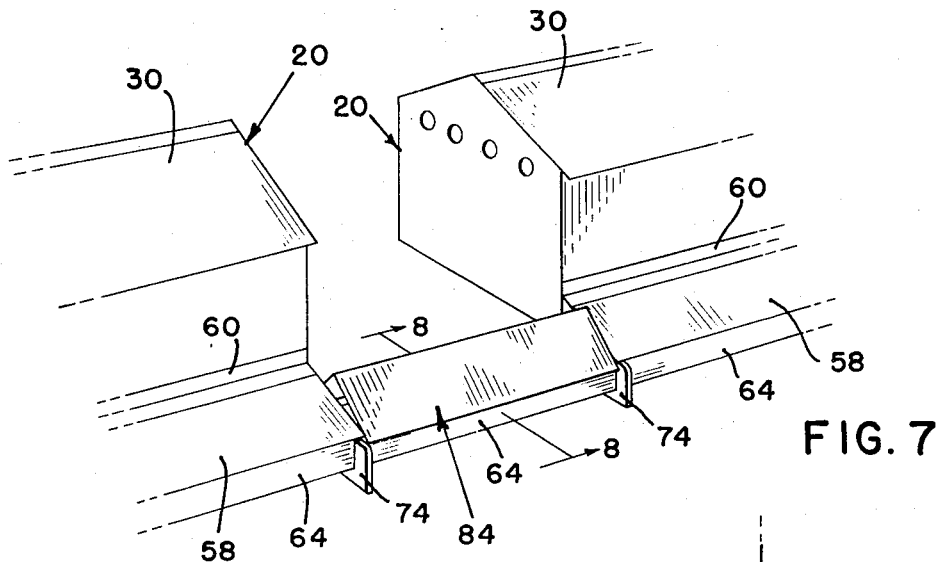
FIG. 7
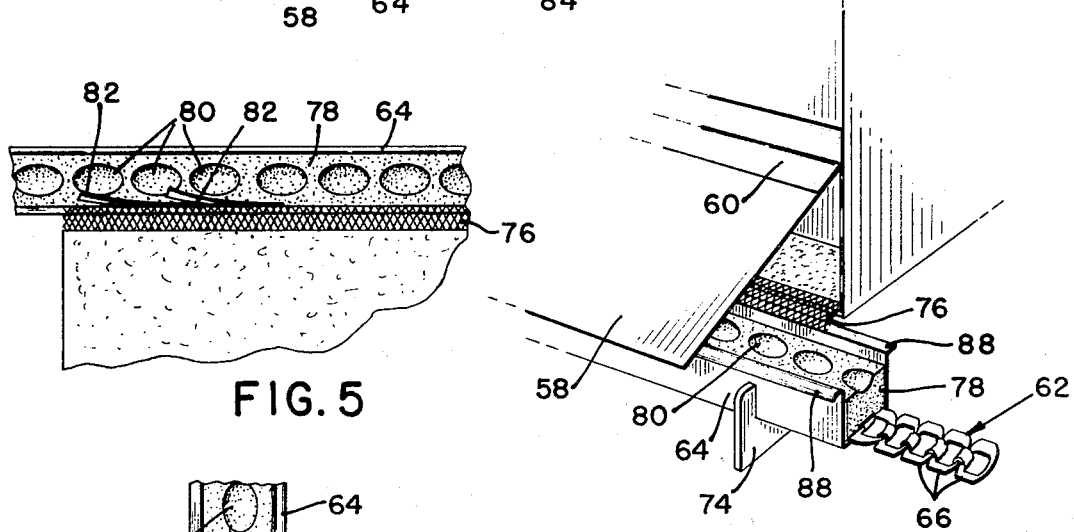
FIG. 5
FIG. 4
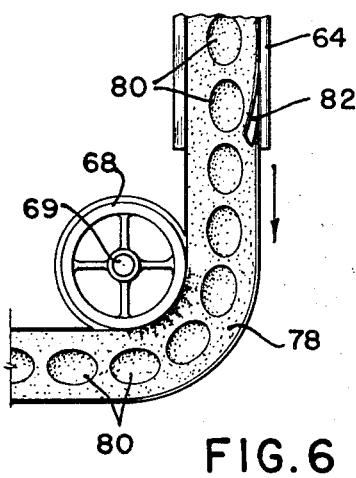
FIG. 6
INVENTOR
GRADY C. FOWLER
BEN F. VENABLE
BY
attorney

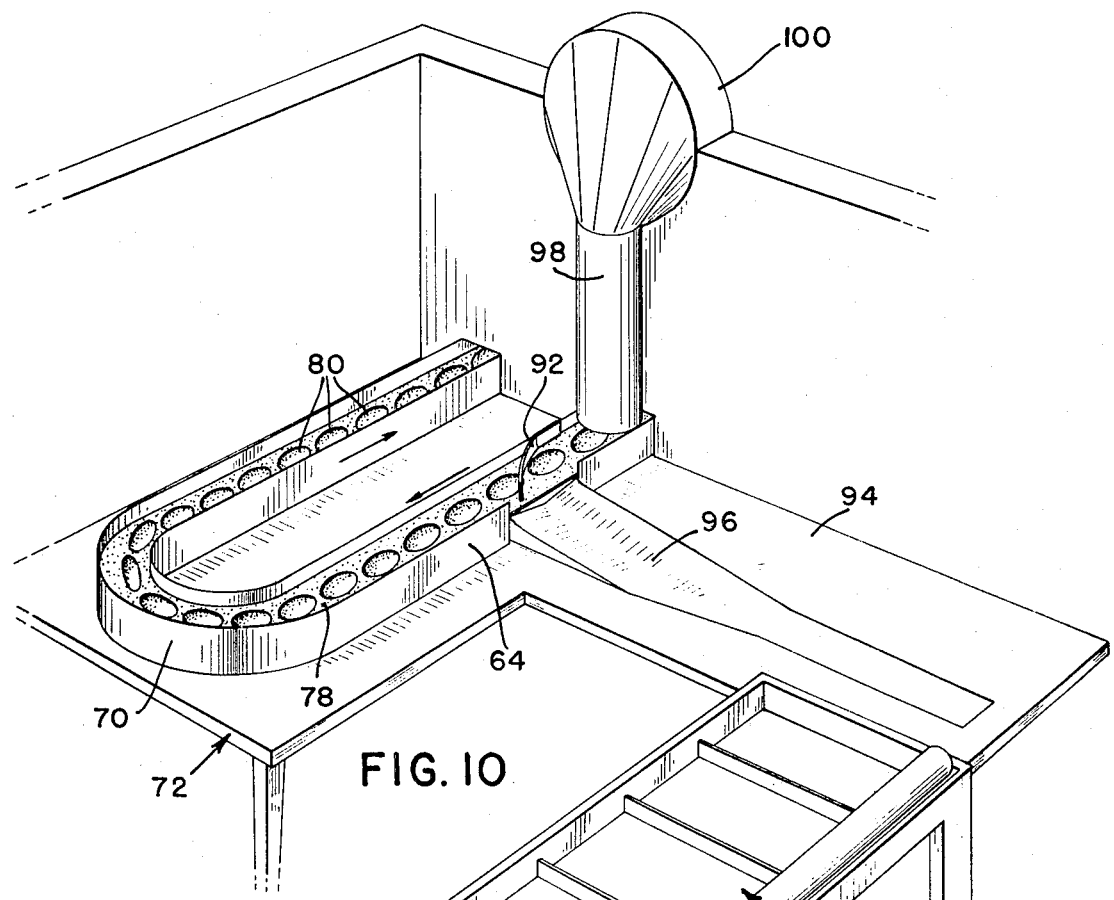
FIG. 10
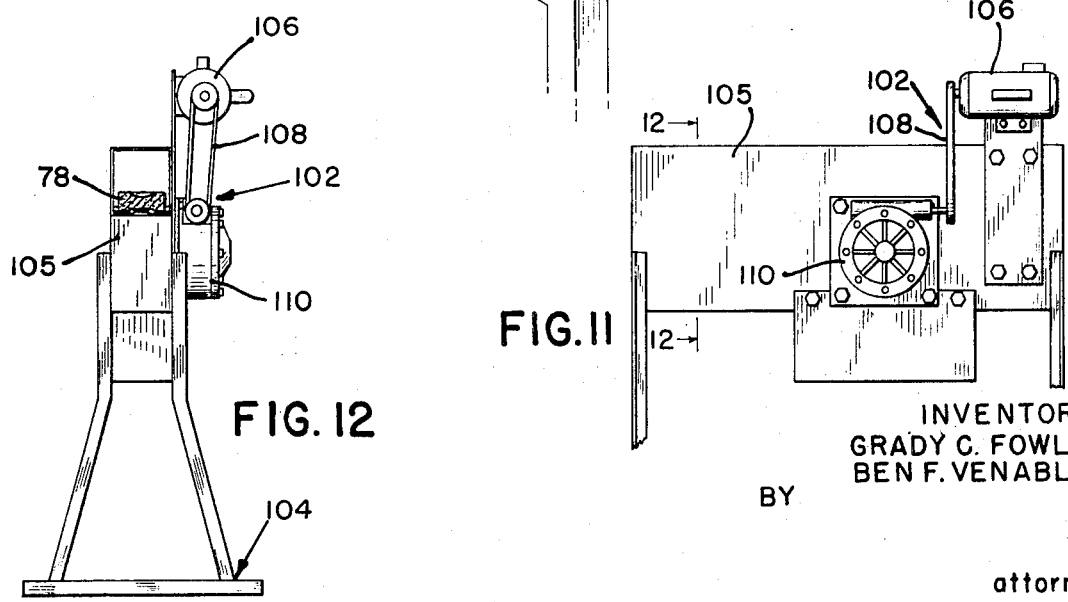
FIG. 12
FIG. 11
INVENTOR
GRADY C. FOWLER
BEN F. VENABLE
BY
attorney

AUTOMATIC EGG COLLECTION SYSTEM FOR POULTRY NESTS

BACKGROUND, BRIEF SUMMARY, AND OBJECTS OF THE INVENTION

This invention generally relates to a new and improved system for collecting eggs from laying nests and delivering them to a common location, and more particularly to gathering eggs from one or more aligned nests having sloping bottoms which cause the eggs when laid to roll through an opening in the nest and onto a mechanical conveying apparatus for prompt delivery to an egg room for grading.

Briefly, the invention utilizes a plurality of nesting units for discharging eggs to a receiving means, having a plurality of egg-receiving indentations therein, which is mounted upon a conveyor. Each nesting unit is provided with readily removable roof panels and a removable pad for facilitating cleaning and maintenance of the nests. The floor pad is conveniently mounted in or removed from the nests by displacement through an elongated opening just above the nest bottom surface. The pad, which may be made of polypropylene fibers as used in indoor-outdoor type carpet, should be of long lasting material that can be cleaned frequently without damage thereto. Releasable clamping means located on the exterior portions of the nest housing maintains the pad in position. The sloped bottom surface rolls the eggs out of the housing, over a wire mesh ramp and onto the conveyor. Both the conveyor and the nests are supported by common frame means. Deflectors or flaps are positioned along the conveyor for positioning the eggs in single file within the indentations to prevent breakage. Displaceable covers enclose the upper portions of the entire conveyor assembly located within the nesting areas. By avoiding breakage, minimizing dirtying of the eggs as well as preventing access by the hens to the conveyor, the egg-gathering system can be maintained in a sanitary state over a long period of time.

One of the primary objects of the invention is an improved system for gathering eggs which prevents egg breakage.

Another object of the invention is the provision of nesting units which can be readily and conveniently cleaned, thus improving the sanitary conditions within the poultry house.

Still another object of the invention is the provision of means for reducing the trash transferred from the nest to the conveyor and for removing trash from the conveyor.

Another feature of the invention is the provision of shields for preventing the chickens from pecking or breaking eggs traveling on the conveyor.

Other objects and advantages of the invention will become apparent during the course of the following detailed description.

BRIEF DESCRIPTION OF THE FIGURES

FIG. 1 is a schematic, top plan view of a poultry house equipped with a plurality of nests arranged for delivering eggs onto a conveyor common to all nests, the conveyor being arranged to deliver the eggs to a collection table;

FIG. 2 is an enlarged perspective view of one of the nests;

FIG. 3 is a cross-sectional view of the nests of FIG. 1 taken along line 3—3 of FIG. 2;

FIG. 4 is an enlarged, fragmentary perspective view of the relationship of the nests with the conveyor;

FIG. 5 is a fragmentary, top plan view of the conveyor illustrating the deflectors for preventing egg breakage;

FIG. 6 is a fragmentary, top plan view of the conveyor illustrating a guide member for directing the movement thereof and also illustrating an egg separator;

FIG. 7 is a fragmentary, perspective view of adjacent nests illustrating a conveyor covering apparatus positioned therebetween;

FIG. 8 is a cross-sectional view taken along line 8—8 of FIG. 7;

FIG. 9 is an enlarged, fragmentary side elevational view of the means for releasably securing the floor padding within the nests;

FIG. 10 is an enlarged perspective view of the egg removal station and the collection and grader table;

FIG. 11 is a side elevational view of the conveyor driving mechanism; and

FIG. 12 is a sectional view taken along line 12—12 of FIG. 11.

DETAILED DESCRIPTION OF THE INVENTION

Referring to the drawing, FIG. 1 illustrates schematically the general assembly of elements located within an enclosed structure or poultry house 10 including the nest units 12 and the egg conveyor 14. The conveyor 14 is common to and spaced closely adjacent the nest units 12 and travels, as shown by the arrows in FIG. 1, to deliver the eggs to an egg room 16 where they are removed from the conveyor and deposited on a grading table 18.

The general structure of each nest unit 12 includes a boxlike housing 20 comprising a bottom or base 22, parallel side walls 24 and 26, end walls 28, 28 and top or roof panels 30, 30, maintained in assembled relation by suitable fastening means, not shown. Each unit 12 is individually supported by interconnected frame members 32 and 34 which are located at the ends of each housing 20.

Each of the front and rear walls 24 and 26 are provided with a plurality of openings 36 for entry and departure of the hens from the nests. Although not shown on the drawing, rigid partitions extending between and secured to the side walls 24 and 26 may be provided to subdivide the space between end walls 28 into a plurality of nesting areas. Openings 29 have been provided in the end walls 28 for ventilation.

The base 22 is inclined from the wall 24 toward the wall 26, as shown by FIG. 3, so that the eggs will roll by gravity onto the conveyor 14. The lowermost portion of the side wall 24 is spaced above the base 22 providing an egg roll-out opening 38. A pad 40 is placed within each nest upon base 22 and constitutes the nesting material on which the hens rest and lay the eggs. The pad 40 is releasably secured within a nest by a serrated plate 40 adjustably secured to the exterior of housing side wall 26. Releasable fasteners 44 extend through wall 26 and elongated slots 46 in plate 42 for adjustably positioning the plate 42. The plate 26 is secured above the base 22 thus providing a small opening 48 extending longitudinally of each nest for receiving the padding 40 therethrough. The padding is inserted within the nest by loosening fasteners 44 and moving plate 42 upwardly. After the padding has been placed within the nest by inserting it through opening 48, the plate 42 is urged downwardly with the serrated edge gripping the padding 40. Fasteners 44 are tightened to secure the pad in position. While the padding material and construction may vary, in the preferred embodiment the material consists of indoor-outdoor type carpet. Since the indoor-outdoor carpet is not readily susceptible to water damage, the carpet can be periodically removed, cleaned and reinstalled quickly and conveniently.

In order to facilitate cleaning of the nests, the top panels 30, 30 are not secured to the housing structure but merely rest upon the upper edge portions of walls 24, 26, 28 and frame member 50. The two panels 30, 30 are secured to each other by a fabric hinge 52 extending substantially the full length of each nest. The panels 30 may be pivoted, as shown in dotted outline in FIG. 3, or completely removed from the housing 20 to provide access to the nests for repairs, cleaning and other operations.

At one side of each housing 20, brackets 54 have been secured thereto for supporting a longitudinally extending perch 56 for assisting the hens in entering the nests. At the opposite side of the housing, a longitudinally extending member 58 is mounted for pivotable movement upon the lower portion of side wall 24. The member 58 consists of an alighting board or perch secured to wall 24 by a fabric hinge 60 for upward swinging movement as shown in FIG. 3. The member 58 facilitates the entry of hens into the nests and at the same time serves as a cover for conveyor 14 to exclude refuse therefrom and to prevent hens from roosting on the conveyor at nights.

The conveyor 14 comprises an endless chain 62, as most clearly shown in FIG. 4, mounted for slideable displacement within a generally U-shaped trough 64. The chain consists of a series of generally flat plates 66 secured to each other for pivotal movement about vertical axes as they are displaced in a generally horizontal plane adjacent the nest 12 and into the egg room 16. Normally, pulleys or flanged wheels 68 such as shown in FIG. 6 are mounted upon suitable support structures for rotation about the vertical axes 69 to direct and guide the conveyor 14 in a prescribed manner as the direction of movement of the conveyor changes. However, in the egg room 16, the arcuate section 70 of trough 64 reverses the path of travel, as shown by FIG. 10. In the egg room the trough 64 is supported upon a framework 72, while the trough sections adjacent the nest 12 are supported within recesses formed in brackets 74 which are secured to the frame members 34. The brackets 74 are positioned upon members 34 such that the trough 64 is spaced approximately ½ to 1 inch from the nest housings. The space is covered with a wire mesh 76 to allow trash and refuse to fall out of the nest and onto the ground rather than onto the conveyor and yet provide a means for directing the eggs from the base 22 onto the conveyor positioned within the trough.

The entire upper portion of the chain 62 has mounted thereon a resilient foam material 78 for receiving the eggs discharged from nest 12. The foam padding, which may be secured to the chain links 66 by glueing or other suitable means, corresponds in width substantially to the width of trough 64. A series of oval indentations 80 roughly corresponding to an egg in size and shape, are provided throughout the longitudinal extent of the conveyor for receiving and maintaining the eggs therein to prevent egg breakage.

Intermediate the nesting units 12, the upper portion of the conveyor 14 is enclosed by shields or covers 84 as shown by FIGS. 7 and 8, to protect the eggs. The covers 84 have angle brackets 86 secured to the inner portions thereof for engaging the lips 88 of trough 64 to retain the covers in a stationary manner while permitting the covers to be removed readily to gain access to the conveyor. Alternatively, the conveyors 84 may be hinged to the trough 64 adjacent one of the trough lips 88. Therefore, it can be seen that the entire conveyor 14 within the nesting area of the structure 10 is protected by the hinged boards 58 and the removable covers 84 to prevent poultry from gaining access to and damaging the eggs once they have been received on the conveyor.

The conveyor 14, which is common to all nest units 12, passes through openings in a partition or wall 90 for directing the eggs into the egg room 16. In order to remove the eggs from the conveyor 14, a tapered deflector 92 is arranged at the end of the gathering table 94 for urging eggs off the foam material 78 onto the incline 96 onto collection table 94. The eggs may be removed by hand from table 94 and placed within suitable compartments of the grader 18. A negative pressure duct 98, positioned just above the conveyor as it enters the egg room 16, is connected to an exhaust fan 100 for removing trash, shaving, feather, etc. that may accumulate on the material 78.

A power unit 102 supported upon a base 104 and housing 105 is provided for driving the endless chain 62 continuously or intermittently. The chain is driven by a suitable means from motor 106 through belt 108 and gear reducer 110. While the power unit 102 has been illustrated by FIG. 1 as being positioned intermediate the nesting units 12 and the egg room, the unit would function equally well at other locations.

We claim:

1. An egg handling system comprising: an endless conveyor supported for displacement in a substantially horizontal plane for transporting eggs to a predetermined location, means mounted for displacement with said conveyor for receiving and retaining eggs thereon in random fashion, said receiving means having at least one egg receiving recess therein, means cooperating with said receiving means for displacing predetermined eggs relative to said endless conveyor for positioning the predetermined eggs at prescribed locations on said egg receiving means.

2. An egg handling system as defined in claim 1, wherein said conveyor includes a chain formed from a series of generally flat plates.

3. An egg handling system as defined in claim 1, further comprising at least one nesting unit positioned in spaced relation to said conveyor.

4. An egg handling system as defined in claim 3, said nesting unit including a housing having an egg roll-out opening, an inclined bottom surface sloping toward said opening, and means positioned intermediate said bottom surface and said conveyor for directing eggs to said conveyor, and for preventing the transfer of trash from said nesting unit to said conveyor.

5. An egg handling system as defined in claim 1, further including a plurality of nesting units, frame means supporting said nesting units, and said conveyor being supported by said frame means.

6. An egg handling system as defined in claim 5, further including means for covering said conveyor to prevent access of poultry thereto.

7. An egg handling system as defined in claim 3, said nesting unit comprising a housing including a bottom surface, a removable pad positioned on said surface, and means exteriorly of said housing for releasably securing said pad within said housing.

8. An egg handling system as defined in claim 1, wherein said receiving means comprises a resilient padding secured to said conveyor, said padding having a plurality of discrete egg-receiving indentations formed therein.

9. An egg handling system as defined in claim 8, said means cooperating with said receiving means including a plurality of deflectors positioned above said padding for urging the eggs into said indentations.

10. An egg handling system as defined in claim 9, further including means for automatically removing eggs from the conveyor for displacement to a selected location for subsequent grading.

11. The method of gathering eggs from nests and transferring them to a common collection location comprising the steps of: dispensing eggs from nests into a moving conveyor means in random fashion; providing on the conveyor means at least one egg receiving and retaining means; conveying the eggs in predetermined directions; selectively positioning said eggs at predetermined locations on said egg receiving and retaining means on the conveyor means; and automatically removing all eggs from the conveyor at a predetermined location.

12. The method of gathering eggs as defined in claim 11, wherein said eggs are positioned at predetermined locations by deflecting the eggs.

* * * * *